US011223924B2

(12) United States Patent
Vilkamo et al.

(10) Patent No.: US 11,223,924 B2
(45) Date of Patent: Jan. 11, 2022

(54) AUDIO DISTANCE ESTIMATION FOR SPATIAL AUDIO PROCESSING

(71) Applicant: Nokia Technologies Oy, Espoo (FI)

(72) Inventors: Juha Vilkamo, Helsinki (FI); Mikko-Ville Laitinen, Helsinki (FI)

(73) Assignee: Nokia Technologies Oy, Espoo (FI)

(*) Notice: Subject to any disclaimer, the term of this patent is extended or adjusted under 35 U.S.C. 154(b) by 1 day.

(21) Appl. No.: 16/624,355

(22) PCT Filed: Jun. 14, 2018

(86) PCT No.: PCT/FI2018/050461
§ 371 (c)(1),
(2) Date: Dec. 19, 2019

(87) PCT Pub. No.: WO2018/234628
PCT Pub. Date: Dec. 27, 2018

(65) Prior Publication Data
US 2021/0152969 A1    May 20, 2021

(30) Foreign Application Priority Data

Jun. 23, 2017   (GB) ..................... 1710093

(51) Int. Cl.
H04S 7/00      (2006.01)
H04R 3/00      (2006.01)
H04R 5/027     (2006.01)

(52) U.S. Cl.
CPC ............ *H04S 7/304* (2013.01); *H04R 3/005* (2013.01); *H04R 5/027* (2013.01); *H04S 2400/11* (2013.01)

(58) Field of Classification Search
CPC ..... H04S 7/304; H04S 2400/11; H04R 3/005; H04R 5/027

(Continued)

(56) References Cited

U.S. PATENT DOCUMENTS 8,194,500 B2   6/2012   Wolff et al.
9,485,574 B2   11/2016  Sun et al.
(Continued)

FOREIGN PATENT DOCUMENTS

JP   2009/216473 A   9/2009
JP   2009243894 A   10/2009
(Continued)

OTHER PUBLICATIONS

Kowalczyk, K., et al., "Parametric Spatial Sound Processing: A flexible and efficient solution to sound scene acquisition, modification, and reproduction", Mar. 1, 2015, IEEE Signal Processing Magazine, vol. 32, No. 2, 12 pgs.

(Continued)

*Primary Examiner* — William A Jerez Lora
(74) *Attorney, Agent, or Firm* — Harrington & Smith

(57) ABSTRACT

A method for spatial audio signal processing including: determining at least one first direction parameter for at least one frequency band based on microphone signals received from a first microphone array; determining at least one second direction parameter for the at least one frequency band based on at least one microphone signal received from at least one second microphone, wherein microphones from the first microphone array and the at least one second microphone are spatially separated from each other; processing the determined at least one first direction parameter and the at least one second direction parameter to determine at least one distance parameter for the at least one frequency band; and enabling an output and/or store of the at least one distance parameter, at least one audio signal, and the at least one first direction parameter.

20 Claims, 8 Drawing Sheets

(58) Field of Classification Search
USPC .............................................. 381/1, 309, 310
See application file for complete search history.

(56) References Cited

U.S. PATENT DOCUMENTS

| | | |
|---|---|---|
| 2009/0207131 A1 | 8/2009 | Togami et al. |
| 2013/0259243 A1* | 10/2013 | Herre ................. G10L 19/00 381/57 |
| 2015/0098571 A1* | 4/2015 | Jarvinen ................. H04S 7/302 381/1 |
| 2015/0156578 A1 | 6/2015 | Alexandridis et al. |
| 2015/0296319 A1 | 10/2015 | Shenoy et al. |
| 2016/0057522 A1 | 2/2016 | Choisel et al. |
| 2017/0366914 A1* | 12/2017 | Stein ................. H04S 7/303 |

FOREIGN PATENT DOCUMENTS

| WO | WO 2018/064296 A1 | 4/2018 |
|---|---|---|
| WO | WO-2017/073324 A1 | 8/2018 |

OTHER PUBLICATIONS

Song, M., et al., "Personal 3D Audio System with Loudspeakers", Jul. 19, 2010, Multimedia and Expo (ICME), 2010 IEEE International Conference, Piscataway, NJ, USA 6 pgs.

* cited by examiner

AUDIO DISTANCE ESTIMATION FOR SPATIAL AUDIO PROCESSING

CROSS REFERENCE TO RELATED APPLICATION

This patent application is a U.S. National Stage application of International Patent Application Number PCT/FI2018/050461 filed Jun. 14, 2018, which is hereby incorporated by reference in its entirety, and claims priority to GB 1710093.4 filed Jun. 23, 2017.

FIELD

The present application relates to apparatus and methods for time-frequency domain audio distance estimation, but not exclusively for time-frequency domain audio distance estimation for six degree of freedom spatial processing applications.

BACKGROUND

Capture of audio signals from multiple sources and mixing of audio signals when these sources are moving in the spatial field requires significant effort. For example the capture and mixing of an audio signal source such as a speaker or artist within an audio environment such as a theatre or lecture hall to be presented to a listener and produce an effective audio atmosphere requires significant investment in equipment and training.

A commonly implemented system is where one or more 'external' microphones, for example a Lavalier microphone worn by the user or an audio channel associated with an instrument, is mixed with a suitable spatial (or environmental or audio field) audio signal such that the produced sound comes from an intended direction.

The general field of the technology is spatial sound capture from OZO or a similar capture device or a group of capture devices. In particular there is known and implemented spatial sound capture which, for a dedicated decoder, enables 3 degrees of freedom (3DOF) audio reproduction using headphones, a head-mounted display (HMD), and a computer (or any similar configuration such as a smart phone attached to a VR mount).

The 3DOF consists rotations. Sensors in present HMDs can provide this 3DOF information to existing systems such as OZO Software Suite or YouTube 360. The user can then rotate the head to view different angles of the captured VR content.

From existing VR games it is evident that 6DOF greatly improves the immersion to the VR environment. 6DOF video capture and reproduction for other VR/MR/AR applications is thus expected. While audio-only 6DOF is technically possible, it is expected that a typical situation will involve both video and audio being captured and reproduced in 6DOF. Thus where 6DOF video reproduction is enabled, it is necessary to also enable 6DOF audio reproduction, or the overall experience may be distracting. For example not implementing a 6DOF audio system while implementing a 6DOF video system may result in hearing the sound of a talker arriving a direction other than where the talker is seen. In VR reproduction, it is critical to have matching auditory and visual perception, since hearing is used to orientate the viewing direction when the source is not in the field of view.

With respect to FIG. 1, there is shown the effect of 3DOF and 6DOF implementations in a VR playback implementation of captured content. In these examples the user 103 perceives the world through a head-mounted display (with the ability to perform 6DOF tracking) and headphones. In the first example, shown by the left part of the figure, a typical 3DOF reproduction system is shown, which does not allow the translation for captured VR content. A user in such a system is located at the centre position 101 and can experience change where a rotation of the head-mounted display is detected causing a change in the direction of arrival of the perceived audio signal and the image. However any user translational movement does not affect the audio or visual scene which creates an unnatural world for the user where the environment seems to move along with the user movement.

The centre part of FIG. 1 shows an example wherein 6DOF video is enabled, however audio is only enabled for 3DOF. In this case, the user can move in the VR world. This with respect to visual perception produces a more natural world, however, the further the distance 105 the user 103 moves from the centre point 101, the greater the discrepancy between auditory perception 106 and visual scene perception 104.

This would result in deteriorated perceived spatial audio quality. Especially, as in the case in FIG. 1 a 3DOF binaural rendering is performed together with 6DOF video rendering, the lack of 6DOF audio rendering decreases the level of naturalness, and may even create a situation that the video and the audio sources are perceived to be separate sources (e.g., if a person is speaking, the speech is not perceived to originate from the mouth, but instead as a separate "floating" source). Furthermore, if the sound is perceived at a different direction than the visual source, the user of the VR content may have difficulty to orientate to the right direction when the visual source is out of the field of view.

The right part of FIG. 1 shows an example wherein 6DOF is enabled for both audio and video. This produces a reproduction similar to natural viewing/listening.

It is possible using video capture to generate a depth map to determine the distance of the visual scene from the capture device, and use this information to move the nearby visual objects differently than the far-away objects according to the viewer/listener translation, hence enabling 6DOF video rendering.

FIG. 2 illustrates the amount the user translation affects the angle and the amplitude (of the direct sound component) of a sound source. Thus for example the left graph 201 shows the plot of angle correction against movement measured in terms of source distance where a first plot 205 shows a motion in the direction of the source (and thus no correction is needed) and a second plot 207 where a perpendicular motion requires correction. Furthermore the right graph shows the plot of amplitude correction against movement measured in terms of source distance where a first plot 215 shows a motion in the direction of the source (and where correction is needed as the sound source is approached/retreated from and thus should be perceived as being louder/quieter) and a second plot 217 where a perpendicular motion requires correction.

As such it is understood that not only a 6DOF audio reproduction system is required to prevent a mismatch when 6DOF video is implemented but in order to determine the required amount of angle/amplitude correction for 6DOF reproduction a distance estimate between the 'sound source' and the capture device is required.

Current audio capture methods determine spatial metadata, such as directions and energy-ratios associated with sounds, but not distances. In other words, the angle of the arriving sound is known, but not the position where it originates. The lack of distance metadata means that only 3DOF rendering can be performed where only the head rotation can be taken into account.

In video games or studio-mixed object-based spatial sound content the source positions (i.e., their angles and distances) are known, and thus 6DOF rendering is readily available.

However, the state-of-the-art parametric spatial audio capture methods enable analysis of direction(s) and other parameters in frequency bands, but not distances.

Methods to estimate the distance parameter in frequency bands have been proposed. However, they are not optimal in all scenarios. Methods to obtain the distance parameter in frequency bands based on the fluctuation of the directional metadata parameter have for example been proposed. When a source is moved closer to the microphone array, its relative directional energy with respect to the reverberating sound energy becomes higher and the directional fluctuation becomes lesser. In other words, the directional fluctuation can contain information about the source distance. In some acoustic conditions the approach of using the fluctuation parameter performs well and does not require any additional hardware over that required by conventional spatial audio signal analysis.

However, there are conditions where the fluctuation (or similar) parameter may not always be reliable. For example when the recording takes place outdoors reverberation may be practically non-existent. Thus, the fluctuation parameter may not convey information about the source distance. Furthermore the microphone noise, such as wind noise, affects also the fluctuation parameter. The direct-to-ambience ratio becomes lower, and the directional parameter fluctuates more. Therefore, the wind noise and similar noises cause the distance parameter to be exaggerated. Also estimating the distance based on fluctuation needs to be calibrated or fitted for each room or space (either automatically or manually) in order to produce accurate distance estimations. If the room characteristics change, for example, if a heavy curtain is lowered or a door/window is opened, the room acoustic properties can change and the distance estimates may become unreliable.

As such although fluctuation distance estimates solve many practical scenarios they are applicable in only some recording conditions. Hence, methods providing accurate distance in frequency bands in all acoustical conditions are needed.

SUMMARY

There is provided according to a first aspect an apparatus for spatial audio signal processing, the apparatus comprising at least one processor configured to: determine at least one first direction parameter for at least one frequency band based on microphone signals received from a first microphone array; determine at least one second direction parameter for the at least one frequency band based on at least one microphone signal received from at least one second microphone, wherein microphones from the first microphone array and the at least one second microphone are spatially separated from each other; process the determined at least one first direction parameter and the at least one second direction parameter to determine at least one distance parameter for the at least one frequency band; and enable an output and/or store of the at least one distance parameter, at least one audio signal, and the at least one first direction parameter.

The at least one distance parameter may be determined for the at least one frequency band based on the positions of each of the spatially separated microphones.

The at least one first direction parameter may comprise a direction value.

The at least one first direction parameter may further comprise at least one of: an energy value associated with the direction value; an energy ratio value associated with the direction value; and a direct-to-total energy ratio value.

The at least one second direction parameter may comprise a second direction value.

The at least one second direction parameter may further comprise at least one of: a second energy value associated with the second direction value; a second energy ratio value associated with the second direction value; and a second direct-to-total energy ratio value.

The at least one second microphone may comprise at least one of: a microphone array comprising a plurality of microphones, wherein the at least one second direction parameter is determined by processing the one or more microphone signals from the plurality of microphones; at least one directional microphone, wherein the at least one second direction parameter is determined by processing at least one directional microphone signal from the at least one directional microphone; and at least one movable directional microphone, wherein the at least one second direction parameter is determined by processing at least one movable microphone signal from the at least one movable directional microphone as it is moved.

The at least one second microphone and the first microphone array may be one of: separate parts of a microphone array; and separate from each other.

The at least one audio signal may comprise one of: at least one audio signal based on the microphone signals received from the first microphone array; at least one audio signal based on microphone signals received from at least one second microphone; at least one audio signal based on microphone signals received from at least one further microphone; and at least one synthesized audio signal.

The at least one first direction parameter may be determined relative to a first defined position and the at least one second direction parameter is determined relative to a second defined position, the first defined position and/or second defined position may comprise one of: a position defined with respect to the first microphone array; a position defined with respect to the at least one second microphone; and a position defined with respect to the at least one further microphone.

The processor may be configured to determine the at least one distance parameter for the at least one frequency band based on whether the at least one distance parameter is a reliable distance estimate.

The processor configured to process the determined at least one first direction parameter and the at least one second direction parameter to determine at least one distance parameter for the at least one frequency band may be configured to: determine vectors pointing towards directions determined by the first direction parameter and the at least one second direction parameter; determine a first line which extends from the first microphone array position along the first direction parameter vector and at least one further line from the at least one second microphone position along the second direction parameter vector; determine a position along the first line and a position along the second line which has a minimum absolute distance, and the at least one distance is based on the position along the first line relative to the first microphone array position.

The processor configured to process the determined at least one first direction parameter and the at least one second direction parameter to estimate at least one distance parameter for the at least one frequency band may be configured to perform one of: determine the at least one distance parameter is the position along the first line relative to the first microphone array position; determine the at least one distance parameter is the position along the first line relative to the first microphone array position when a minimum absolute distance is smaller than a determined threshold; and determine the at least one distance parameter is the position along the first line relative to the first microphone array position when the position along the first direction parameter vector is positive and the position along the second direction parameter vector is positive.

The processor may be further configured to determine whether the at least one distance parameter is a reliable distance estimate by being configured to perform one of: determine the at least one distance parameter is a reliable distance estimate when the minimum absolute distance is smaller than a determined threshold; and determine the at least one distance parameter is a reliable distance estimate when the position along the first direction parameter vector is positive and the position along the second direction parameter vector is positive.

The processor may be configured to determine the at least one distance parameter for the at least one frequency band is a defined value when: either the position along the first direction parameter vector is negative or the position along the second direction parameter vector is negative; and/or the minimum absolute distance is greater than a determined threshold.

The processor may be further configured to generate an indicator based on whether the at least one distance parameter is a reliable distance estimate.

The processor may be further configured to output the at least one distance parameter with the indicator.

The processor configured to determine at least one first direction parameter for at least one frequency band based on microphone signals received from a first microphone array may be configured to: receive the microphone signals from the first microphone array for a time window; time-frequency transform the microphone signals from the first microphone array for the time window; analyse the time-frequency transformed microphone signals from the first microphone array for the at least one frequency band to determine at least one first direction parameter for the at least one frequency band.

The at least one distance parameter for the at least one frequency band may be a distance parameter for the time window.

The processor may be further configured to determine at least one energy ratio parameter for the at least one frequency band based on the time-frequency microphone signals from the first microphone array for the at least one frequency band.

The at least one distance parameter for the at least one frequency band may be determined further based on the at least one energy ratio parameter for the at least one frequency band.

The processor may be further configured to determine the at least one distance parameter for the at least one frequency band is a defined value when the at least one energy ratio parameter for the at least one frequency band is below a determined threshold value The processor may be further configured to determine the at least one distance parameter is a reliable distance estimate when the at least one energy ratio parameter for the at least one frequency band is above a determined threshold value.

The processor may be further configured to associate/combine: the at least one first direction parameter for the at least one frequency band; the at least one energy ratio parameter for the at least one frequency band; the at least one distance parameter for the at least one frequency band; and at least one audio signal.

The processor may be further configured to output the association/combination of: the first direction parameter for the at least one frequency band; the energy ratio parameter for the at least one frequency band; the at least one distance estimate for the at least one frequency band; and the at least one audio signal.

The processor configured to determine the at least one second direction parameter for the at least one frequency band based on microphone signals received from at least one second microphone may be configured to: receive the microphone signals from the at least one second microphone for the time window; time-frequency transform the microphone signals from the at least one second microphone for the time window; and analyse the time-frequency transformed microphone signals from the at least one second microphone to determine a second direction parameter for the at least one frequency band.

The at least one distance parameter, and the at least one first direction parameter may be provided as metadata associated with the at least one audio signal.

According to a second aspect there is provided an apparatus for spatially processing at least one audio signal, the apparatus comprising a processor configured to: receive the at least one audio signal; receive at least one first direction parameter for at least one frequency band based on microphone signals received from a first microphone array; receive at least one distance parameter determined from the at least one first direction parameter and at least one second direction parameter for the at least one frequency band based on at least one microphone signal from at least one second microphone; receive at least one user input defining a six-degrees-of-freedom parameter; and process the at least one audio signal to generate a rendered output audio signal based on: the at least one user input; the at least one direction parameter; and the at least one distance parameter to enable a six-degree of freedom audio reproduction.

The processor may be further configured to receive at least one energy ratio parameter associated with the at least one audio signal for the at least one frequency band; and wherein the processor configured to process the at least one audio signal to generate a rendered output audio signal based on: the at least one user input; the direction parameter; and the distance parameter may be further configured to process the at least one audio signal based on the at least one energy ratio parameter.

The processor may be further configured to: receive an indicator based on whether the at least one distance estimate is a reliable distance estimate; and determine whether to process the at least one audio signal to generate a rendered output audio signal based on the received distance parameter or a default or determined distance parameter based on the indicator.

According to a third aspect there is provided an apparatus comprising a processor configured to: determine at least one first direction parameter for at least one frequency band based on microphone signals received from a first microphone array; determine at least one second direction parameter for the at least one frequency band based on at least one microphone signal received from at least one second microphone, wherein microphones from the first microphone array and the at least one second microphone are spatially separated from each other; process the determined at least one first direction parameter and the at least one second direction parameter to determine at least one distance parameter for the at least one frequency band; enable a store of the at least one distance parameter, at least one audio signal, and the at least one first direction parameter; receive at least one user input defining a six-degrees-of-freedom parameter; and process the at least one audio signal to generate a rendered output audio signal based on: the at least one user input; the direction parameter; and the distance parameter to enable a six-degree of freedom audio reproduction.

According to a fourth aspect there is provided a method for spatial audio signal processing comprising: determining at least one first direction parameter for at least one frequency band based on microphone signals received from a first microphone array; determining at least one second direction parameter for the at least one frequency band based on at least one microphone signal received from at least one second microphone, wherein microphones from the first microphone array and the at least one second microphone are spatially separated from each other; processing the determined at least one first direction parameter and the at least one second direction parameter to determine at least one distance parameter for the at least one frequency band; and enabling an output and/or store of the at least one distance parameter, at least one audio signal, and the at least one first direction parameter.

The at least one distance parameter may be determined for the at least one frequency band based on the positions of each of the spatially separated microphones.

The at least one first direction parameter may comprise a direction value.

The at least one first direction parameter may further comprise at least one of: an energy value associated with the direction value; an energy ratio value associated with the direction value; and a direct-to-total energy ratio value.

The at least one second direction parameter may comprise a second direction value.

The at least one second direction parameter may further comprise at least one of: a second energy value associated with the second direction value; a second energy ratio value associated with the second direction value; and a second direct-to-total energy ratio value.

The at least one second microphone may comprise at least one of: a microphone array comprising a plurality of microphones, wherein the at least one second direction parameter is determined by processing the one or more microphone signals from the plurality of microphones; at least one directional microphone, wherein the at least one second direction parameter is determined by processing at least one directional microphone signal from the at least one directional microphone; and at least one movable directional microphone, wherein the at least one second direction parameter is determined by processing at least one movable microphone signal from the at least one movable directional microphone as it is moved.

The at least one second microphone and the first microphone array may be one of: separate parts of a microphone array; and separate from each other.

The at least one audio signal may comprise one of: at least one audio signal based on the microphone signals received from the first microphone array; at least one audio signal based on microphone signals received from at least one second microphone; at least one audio signal based on microphone signals received from at least one further microphone; and at least one synthesized audio signal.

The at least one first direction parameter may be determined relative to a first defined position and the at least one second direction parameter may be determined relative to a second defined position, the first defined position and/or second defined position may comprise one of: a position defined with respect to the first microphone array; a position defined with respect to the at least one second microphone; and a position defined with respect to the at least one further microphone.

Determining the at least one distance parameter for the at least one frequency band may comprise: determining the at least one distance parameter is a reliable distance parameter estimate; and determining the at least one distance parameter value based on whether the at least one distance parameter is a reliable distance estimate.

Processing the determined at least one first direction parameter and the at least one second direction parameter to determine at least one distance parameter for the at least one frequency band may comprise: determining vectors pointing towards directions determined by the first direction parameter and the at least one second direction parameter; determining a first line which extends from the first microphone array position along the first direction parameter vector and at least one further line from the at least one second microphone position along the second direction parameter vector; and determining a position along the first line and a position along the second line which has a minimum absolute distance, and the at least one distance is based on the position along the first line relative to the first microphone array position.

Processing the determined at least one first direction parameter and the at least one second direction parameter to estimate at least one distance parameter for the at least one frequency band may comprise one of: determining the at least one distance parameter is the position along the first line relative to the first microphone array position; determining the at least one distance parameter is the position along the first line relative to the first microphone array position when a minimum absolute distance is smaller than a determined threshold; and determining the at least one distance parameter is the position along the first line relative to the first microphone array position when the position along the first direction parameter vector is positive and the position along the second direction parameter vector is positive.

Determining the at least one distance parameter is a reliable distance parameter estimate may comprise one of: determining the at least one distance parameter is a reliable distance estimate when the minimum absolute distance is smaller than a determined threshold; and determining the at least one distance parameter is a reliable distance estimate when the position along the first direction parameter vector is positive and the position along the second direction parameter vector is positive.

Determining the at least one distance parameter for the at least one frequency band is a defined value may be when: either the position along the first direction parameter vector is negative or the position along the second direction parameter vector is negative; and/or the minimum absolute distance is greater than a determined threshold.

The method may further comprise generating an indicator based on whether the at least one distance parameter is a reliable distance estimate.

The method may further comprise outputting the at least one distance parameter with the indicator.

Determining at least one first direction parameter for at least one frequency band based on microphone signals received from a first microphone array may comprise: receiving the microphone signals from the first microphone array for a time window; time-frequency transforming the microphone signals from the first microphone array for the time window; and analysing the time-frequency transformed microphone signals from the first microphone array for the at least one frequency band to determine at least one first direction parameter for the at least one frequency band.

The at least one distance parameter for the at least one frequency band may be a distance parameter for the time window.

The method may further comprise determining at least one energy ratio parameter for the at least one frequency band based on the time-frequency microphone signals from the first microphone array for the at least one frequency band.

Determining the at least one distance parameter for the at least one frequency band may further comprise determining the at least one distance parameter based on the at least one energy ratio parameter for the at least one frequency band.

The method may further comprise determining the at least one distance parameter for the at least one frequency band is a defined value when the at least one energy ratio parameter for the at least one frequency band is below a determined threshold value.

The method may further comprise determining the at least one distance parameter is a reliable distance estimate when the at least one energy ratio parameter for the at least one frequency band is above a determined threshold value.

The method may further comprise associating/combining: the at least one first direction parameter for the at least one frequency band; the at least one energy ratio parameter for the at least one frequency band; the at least one distance parameter for the at least one frequency band; and at least one audio signal.

The method may further comprise outputting the association/combination of: the first direction parameter for the at least one frequency band; the energy ratio parameter for the at least one frequency band; the at least one distance estimate for the at least one frequency band; and the at least one audio signal.

Determining the at least one second direction parameter for the at least one frequency band based on microphone signals received from at least one second microphone may comprise: receiving the microphone signals from the at least one second microphone for the time window; time-frequency transforming the microphone signals from the at least one second microphone for the time window; and analysing the time-frequency transformed microphone signals from the at least one second microphone to determine a second direction parameter for the at least one frequency band.

The at least one distance parameter, and the at least one first direction parameter may be provided as metadata associated with the at least one audio signal.

According to a fifth aspect there is provided a method for spatially processing at least one audio signal comprising: receiving the at least one audio signal; receiving at least one first direction parameter for at least one frequency band based on microphone signals received from a first microphone array; receiving at least one distance parameter determined from the at least one first direction parameter and at least one second direction parameter for the at least one frequency band based on at least one microphone signal from at least one second microphone; receiving at least one user input defining a six-degrees-of-freedom parameter; and processing the at least one audio signal to generate a rendered output audio signal based on: the at least one user input; the at least one direction parameter; and the at least one distance parameter to enable a six-degree of freedom audio reproduction.

The method may further comprise receiving at least one energy ratio parameter associated with the at least one audio signal for the at least one frequency band; and wherein processing the at least one audio signal to generate a rendered output audio signal based on: the at least one user input; the direction parameter; and the distance parameter may further comprise processing the at least one audio signal based on the at least one energy ratio parameter.

The method may further comprise: receiving an indicator based on whether the at least one distance estimate is a reliable distance estimate; and determining whether to process the at least one audio signal to generate a rendered output audio signal based on the received distance parameter or a determined distance parameter based on the indicator.

According to a sixth aspect there is provided a method comprising: determining at least one first direction parameter for at least one frequency band based on microphone signals received from a first microphone array; determining at least one second direction parameter for the at least one frequency band based on at least one microphone signal received from at least one second microphone, wherein microphones from the first microphone array and the at least one second microphone are spatially separated from each other; processing the determined at least one first direction parameter and the at least one second direction parameter to determine at least one distance parameter for the at least one frequency band; enabling a store of the at least one distance parameter, at least one audio signal, and the at least one first direction parameter; receiving at least one user input defining a six-degrees-of-freedom parameter; and processing the at least one audio signal to generate a rendered output audio signal based on: the at least one user input; the direction parameter; and the distance parameter to enable a six-degree of freedom audio reproduction.

An apparatus configured to perform the actions of the method as described above.

A computer program comprising program instructions for causing a computer to perform the method as described above.

A computer program product stored on a medium may cause an apparatus to perform the method as described herein.

There may be provided means for performing the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
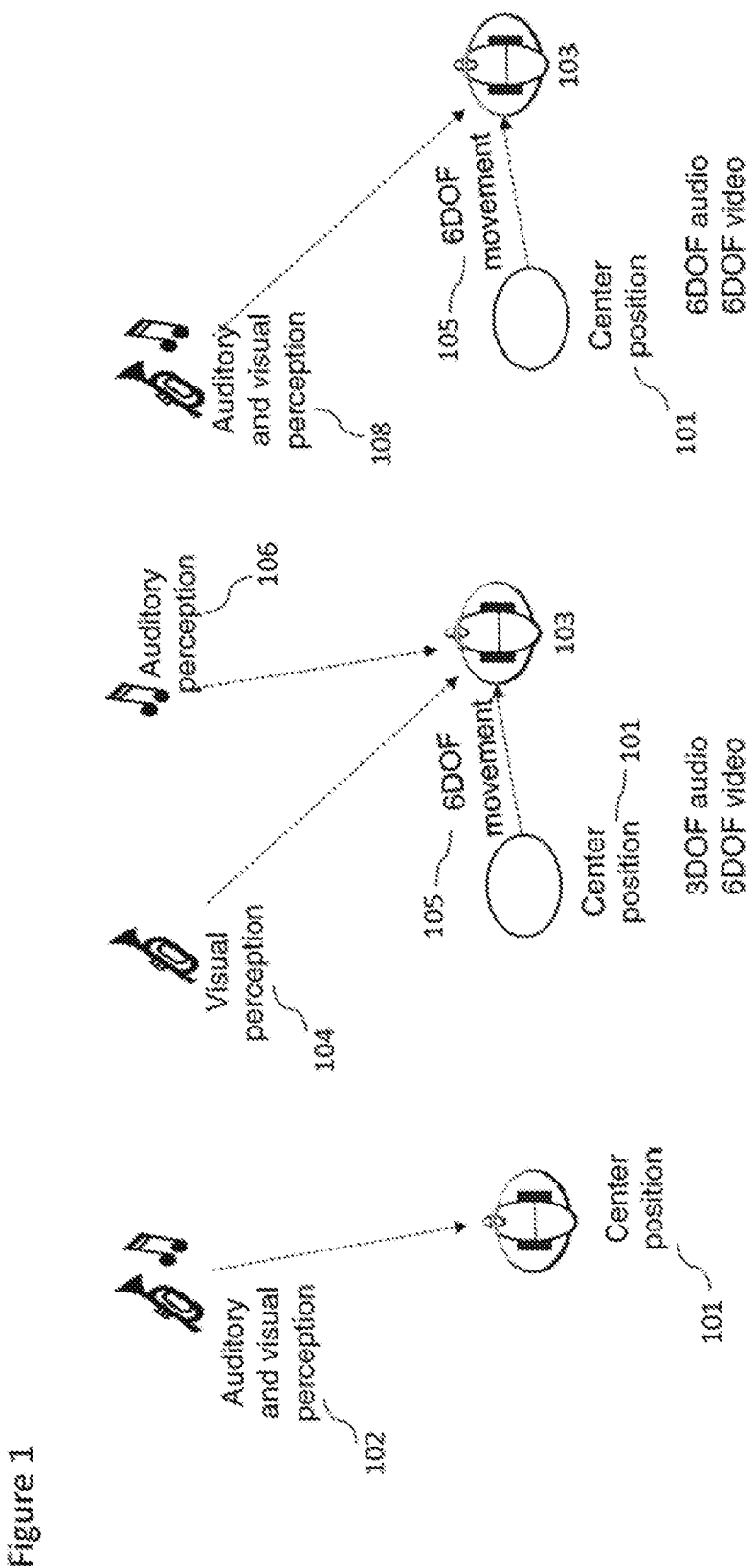
FIG. 1 shows schematically a 3DOF and 6DOF system.
Figure 2:
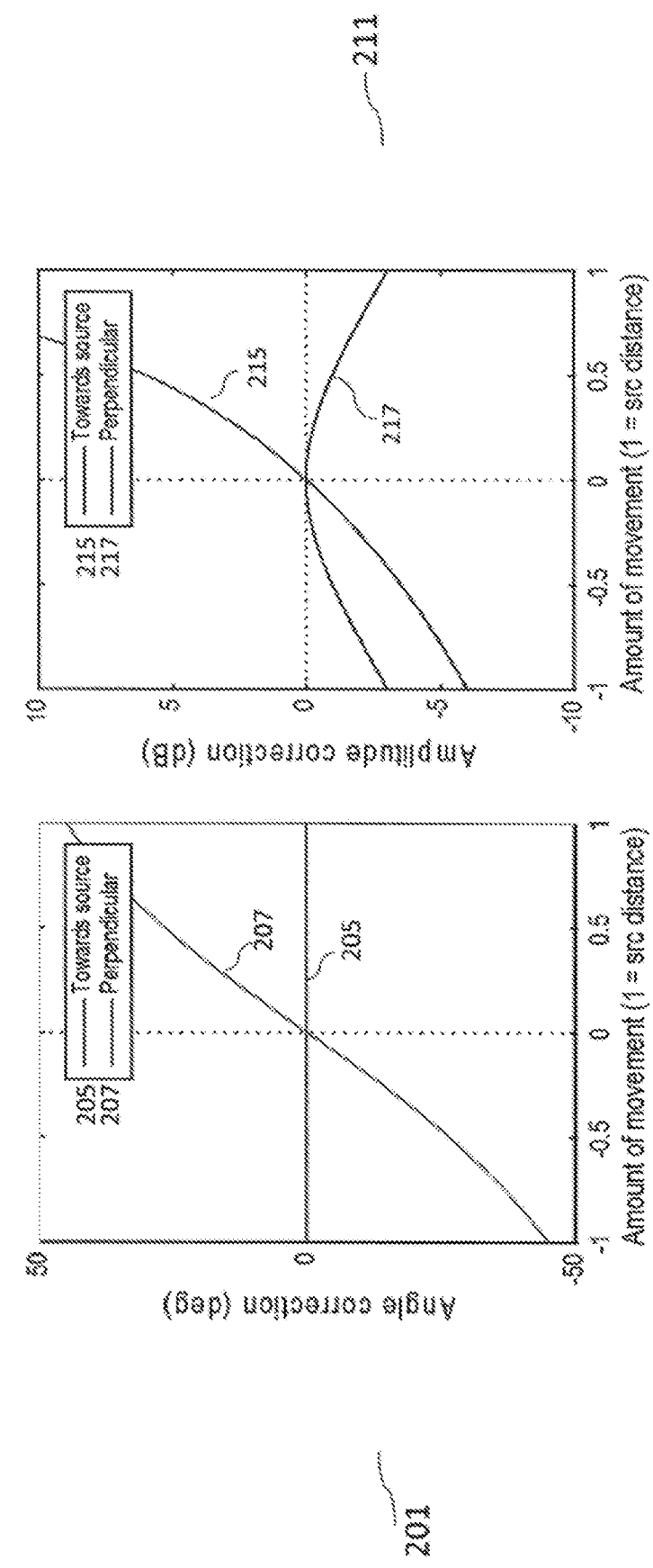
FIG. 2 shows example angle and amplitude corrections for 6DOF reproduction.

The following describes in further detail suitable apparatus and possible mechanisms for the provision of effective sound distance parameter estimates from the capture of audio signals and the implementation of 6DOF audio synthesis.

As described previously utilization of rotation in 3DOF audio reproduction is already widely available in existing systems such as OZO Software Suite or YouTube 360. In such systems the user can rotate their head to view different angles to the captured Virtual Reality (VR) content.

As discussed above the focus of the following aspects is in captured sound (as opposed of studio-reproduced sound or game sound) from a microphone array such as that in OZO or in a smartphone. For such devices (or microphone arrays in general), parametric spatial audio capture methods may be used to enable a perceptually accurate spatial sound reproduction at the position of the capture device.

Parametric spatial audio capture refers to adaptive digital signal processing (DSP) driven audio capture methods. This typically means performing firstly an analysis of perceptually relevant parameters in frequency bands, for example, the directionality of the propagating sound at the recording position, and secondly reproducing spatial sound in a perceptual sense at the rendering side according to the estimated spatial parameters. The reproduction can be, for example, for headphones with support for head-orientation tracking. By estimating and reproducing the perceptually relevant spatial properties (parameters) of the sound field, a perception similar to that which would occur in the original sound field can be reproduced. As the result, the listener can perceive the multitude of sources, their distances, as well as properties of the surrounding physical space, among the other spatial sound features, as if the listener was in the position of the capture device.

Microphone arrays can be used to capture these spatial aspects. A known spatial-audio-reproduction method, called spatial audio capture (SPAC), processes captured microphone signals. It estimates the directions of arrival (DOA) and the ratios between direct and ambient components from the microphone signals in frequency bands, and synthesizes either binaural signals for headphone listening or loudspeaker signals for loudspeaker listening or Ambisonics to enable spatial audio reproduction in VR streaming services such as YouTube 360. In headphone listening, head-orientation tracking can be utilized in 3 degrees of freedom (3DOF) in order to enable head rotation.

The concept as discussed in further detail hereafter is thus an extension of SPAC (or parametric audio) capture and reproduction for 6-degree-of-freedom (6DOF) rendering. In other words, enabling movement within the captured sound scene.

The microphone arrays may be mounted on a VR camera, smart phone, or other devices. In a typical 3D spatial capture with elevation, each microphone array may consist of at least four microphones to have at least some spacing at all spatial axes. Higher end devices may feature microphone arrays with several hundred microphones.

The following provides methods and apparatus to enable determination of perceptually relevant distance parameter relating to the sound field at the recording position. The distance parameter may be used alongside such spatial audio systems as spatial audio capture (SPAC), Directional Audio Coding (DirAC), harmonic planewave expansion (harpex) and enable a six-degree-of-freedom controlled rendering of the sound field at the playback device.

The concept as discussed hereafter in detail is one of audio capture (and synthesis) for 6DOF rendering. As such this requires embodiments wherein the captured audio signals are analysed in frequency bands typically in terms of the direction (or directions) of the arriving sound and the proportions of the direct sound component(s) and the non-directional components.

In other words the concept is concerned with determining a distance parameter(s) in frequency bands from an audio capturing. In such situations these parameters may be then used to adjust the gains (or energies) of the direct component(s) in frequency bands to enable the 6DOF audio reproduction of captured audio.

Adjusting the gains relates primarily to the movement towards or away from the determined direction of the arriving sound as compared to the adjustment of the direction(s) which relate primarily to moving sideways with respect to the determined direction of the arriving sound.

The use case of the present disclosure is in particular the reproduction of microphone-array captured spatial sound (e.g. from an OZO device). In these cases the directional parameters in general do not necessarily point towards a direction of a particular sound source like in virtual worlds. Instead, the directional parameter determines the direction of the arriving sound in a perceptual sense. The sound in a frequency band can arrive, e.g., from a wall reflection, or the arriving sound in a frequency band can be a superimposition of several arriving sounds.

An aspect of this concept is that a property required for 6DOF audio rendering is the distance parameter to be captured in frequency bands. Thus a distance parameter is to be determined additionally to the previous determined spatial audio information. In some embodiments a solution is provided to estimate a distance parameter on a frequency band by band basis based on an analysis of the estimated directional parameters from more than one microphone array.

In some embodiments the distance determination may be performed with a VR capture device such as Nokia OZO (or any other microphone array) where the microphone signals are received/retrieved and then computer software is used to determine the directional and distance parameter estimation. In some embodiments the determination may be performed elsewhere such as within a capture device comprising at least one processor and software to perform the corresponding analysis. A further embodiment may be where the distance parameter is estimated at the decoder side based on the available spatial parameters (e.g., directions) determined from the audio signals from each of the microphone arrays.

In some embodiments the directional and distance parameters may be associated with the audio signals. For example the audio signals have an associated metadata bitstream or file which comprises the parameters and which can be stored or transmitted alongside at least one audio signal in any form (e.g., in an AAC format). The audio and the metadata may be stored or transmitted in a media container along with video, such as spherical video (with any means to enable 6DOF video rendering). The decoder can utilize the directional and distance metadata to enable 6DOF audio rendering at the decoder side using a suitable device such as described herein.

In the following embodiments the term defined position may be interpreted as a locus point or position from which the direction and/or distance is estimated. In some circumstances the defined position may be related to the microphone array. However any suitable position may be used. Furthermore in some embodiments there may be more than one defined position which are located relative to each other by defined distances and directions.

Figure 3B:
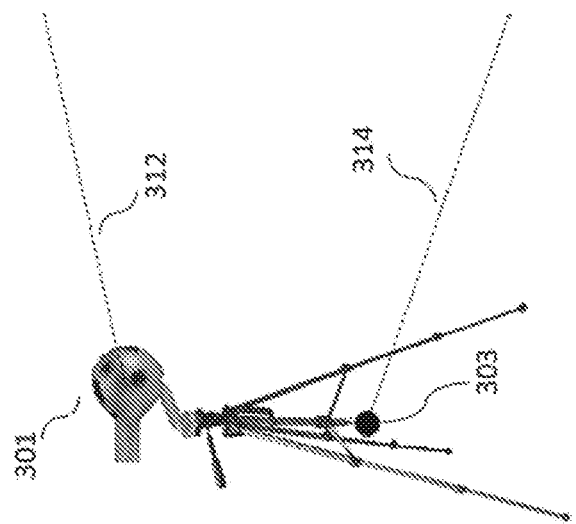
FIGS. 3a and 3b show a system of microphone arrays suitable for implementing some embodiments.
Figure 3A:
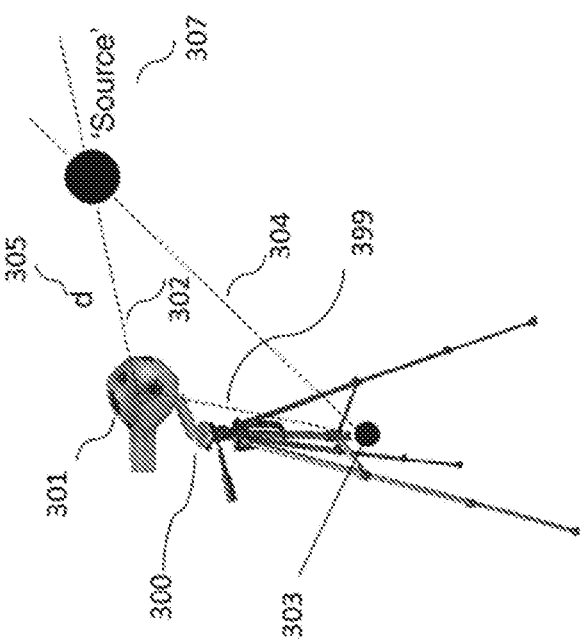

With respect to FIGS. 3a and 3b the concept as expressed in further detail hereafter is clearly shown. In FIGS. 3a and 3b there are shown a first microphone array 301 and a second microphone array 303. In these figures the microphone arrays are mounted on a stand and separated by a defined distance shown in FIG. 3a by the dashed line 399. The microphone arrays 301, 303 are configured to capture audio signals which may be analysed to determine on a frequency band by band basis directions (of arrival). In comparing these determined directions from each of the microphone arrays the apparatus and methods described in further detail may be able to distinguish between cases of reliable distance estimates and unreliable distance estimates. For example in FIG. 3a a sound source 307 which dominates a time-frequency interval is shown. Furthermore is shown the estimated direction of arrival 302 associated with the first microphone array 301 and the direction of arrival 304 associated with the second microphone array 303. In the example shown in FIG. 3a vectors from the microphones arrays along these directions of arrival 302 and 304 intersect or can be shown to closely pass each other indicating a reliable distance estimate d 305 from the first microphone array may be determined. Whereas with respect to FIG. 3b there is no dominant sound source. There is shown an example estimated direction of arrival 312 associated with the first microphone array 301 and the estimated direction of arrival 314 associated with the second microphone array 303. In the example shown in FIG. 3b vectors from the microphones arrays along these estimated directions of arrival 302 and 304 do not intersect or closely pass each other and are shown diverging and can therefore be used to indicate that a reliable distance estimate from the first microphone array cannot be determined. Although the second microphone array is shown in FIGS. 3a and 3b as being a conventional microphone array it is understood that the array may be a directional microphone having a directionality pattern, such as a cardioid. It is thus understood that the array functionality may be provided by a directional microphone and thus the second microphone array replaced by at least one directional microphone (and which may be configured to determine a direction parameter).

Figure 4:
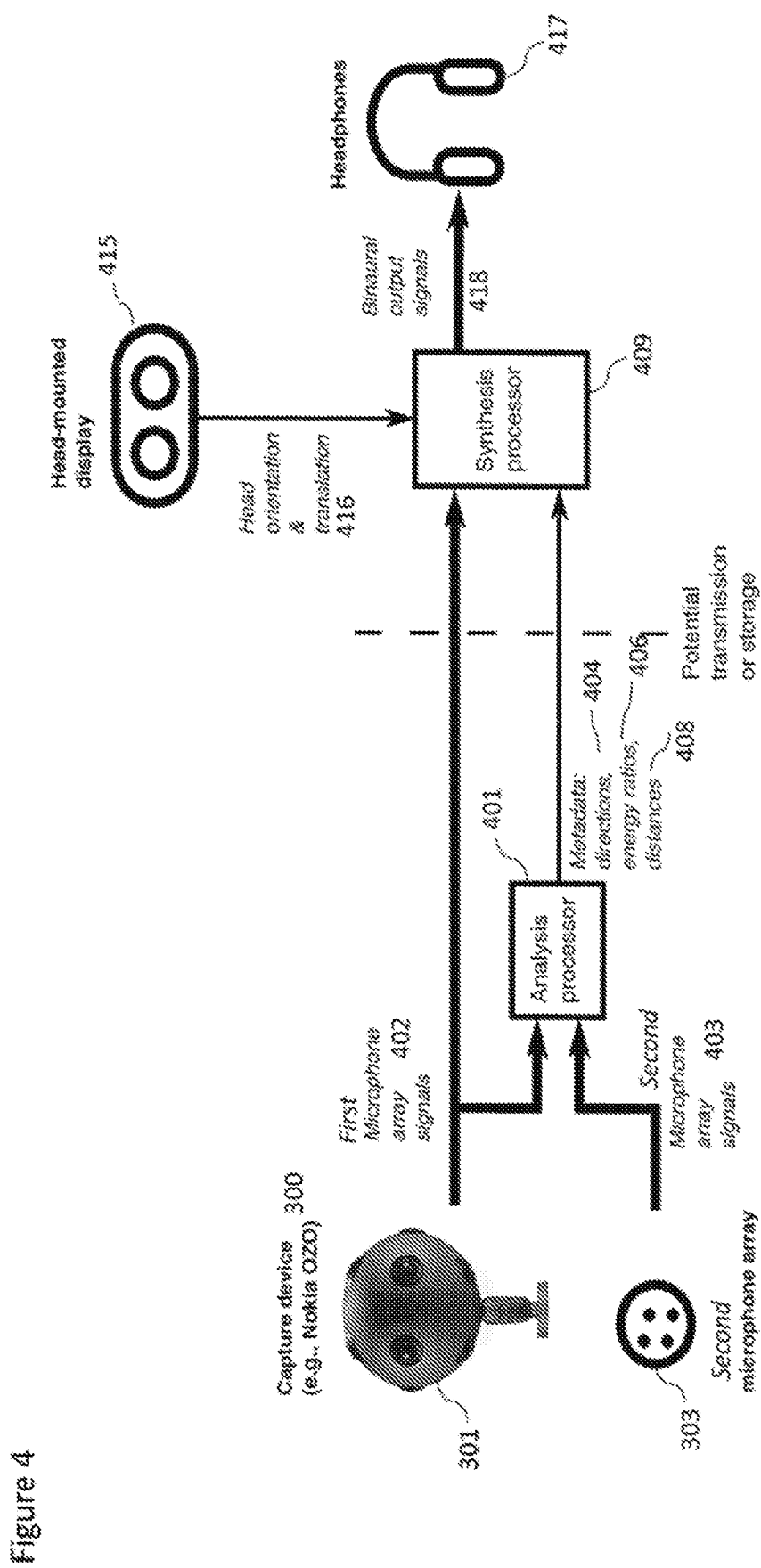
FIG. 4 shows schematically a system for employing the microphone arrays according to some embodiments.

With respect to FIG. 4 an example apparatus and system for implementing embodiments of the application are shown.

In some embodiments the system comprises a capture device 300 in the form of a VR capture device. An example capture device 300 may be a Nokia OZO. However it is understood that in some embodiments the capture device 300 is any suitable apparatus comprising a first microphone array 301 configured to generate at least two audio signals (which are shown in FIG. 4 as the first microphone array audio signals 402). Thus for example the capture device may be a mobile phone or user equipment with multiple microphones arranged as a microphone array.

Furthermore the system comprises a second microphone array 303. The second microphone array 303 is also configured to generate at least two audio signals (which are shown in FIG. 4 as the second microphone array audio signals 403).

In some embodiments the capture device 300 may comprise the second microphone array 303. For example the capture device 300 may comprise a telescopic boom on which the second microphone array 303 is mounted. In some embodiments the second microphone array 303 is located on a device separate from the capture device 300. Thus for example the second microphone array may be mounted on a mobile phone or user equipment with multiple microphones arranged as a microphone array and is separate from the capture device which is a Nokia OZO device.

The distance and the relative positions between the first microphone array 301 and second microphone array 303 may be defined physically (for example by a physical rod or boom or may be determined by any suitable method (for example by using high accuracy indoor radio based positioning estimates).

In the following examples there are shown two microphone arrays one first microphone array 301 and one second microphone array 303. However in some embodiments there may be more than two microphone arrays, each configured to generate audio signals from which directions are estimated and which are then analysed in the same manner as described in detail hereafter. In other words there may be at least two microphone arrays in a system as described hereafter.

In some embodiments the system comprises an analysis processor 401. The analysis processor 401 is configured to receive the first microphone array audio signals 402 (from the capture device 300 or retrieved from memory or otherwise). The analysis processor 401 is further configured to receive the second microphone array audio signals 403 (from the second microphone array 303 or retrieved from memory or otherwise). The analysis processor 401 is configured to generate and output suitable parameters based on an analysis of the first microphone array audio signals 402 and second microphone array audio signals 403. The analysis processor 401 can, for example, be a computer (running suitable software), or alternatively a specific device utilizing, for example, FPGAs or ASICs. The analysis processor 401 in some embodiments may be integrated within the capture device 300 or may be implemented separate from the capture device 300. For example in some embodiments the analysis processor 401 may be implemented within servers within a distributed or cloud based system.

These parameters may comprise direction of arrival (DOA) parameters 404, energy ratios 406, and distances 408. In the following examples the term energy ratio can be the direct-to-total energy ratio. However it is understood that any suitable energy ratio associated with the direction of arrival parameter may be determined and used.

For example in some embodiments the analysis processor 401 is configured to produce metadata on a frequency band by frequency band basis for: the direction-of-arrival (DOA) (azimuth: $\theta(k,n)$, and elevation: $\varphi(k,n)$), the direct-to-total energy ratio $r(k,n)$, and the distance $d(k,n)$ (where k is the frequency band and n is the temporal frame index).

In some embodiments, these parameters may then be associated with the first microphone array audio signals 402. For example in some embodiments the analysis processor

401 may be configured to combine the analysis parameters 404, 406, 408 with the first microphone array audio signals 402 such that the parameters are provided as metadata associated with the first microphone array audio signals.

The parameters and the microphone array audio signals (or subset of the microphone signals) can be processed and reproduced with the same device, or they can be transmitted (or stored and later processed) using a different device configured to reproduce the audio signals and render the audio signals. The audio signals and parameters may thus be stored/transmitted in any suitable format such as an AAC format.

In some embodiments the system comprises a head mounted display (HMD) 415 configured to generate a head orientation and translation signal 416. The head orientation and translation signal 416 can in some embodiments indicate a suitable 6DOF signal representing both rotation and translation information. Although the HMD 415 is shown in FIG. 4 as generating both the head orientation and translation signal in some embodiments the head orientation and translation signal may be generated as separate head orientation and translation signals.

In some embodiments these signals may furthermore be generated by different devices. Thus for example the head orientation signal which features the rotation 3DOF information may be generated by a head tracker device mounted on a headset and the translation signal which features the translation 3DOF information may be generated by a body mounted or worn device (for example a user device in a pocket of the user) tracking the motion of the user.

Furthermore in some embodiments the rotation 3DOF and translation 3DOF information may be set by a user operating a suitable user interface (such as controlling a 'virtual' orientation and position using a touch interface on a tablet, mobile device or other computer).

In some embodiments of the system comprises a synthesis processor 409. The synthesis processor 409 is configured to receive, retrieve or otherwise obtain the first microphone array audio signals 402 (or a suitable downmixed or selected channel and/or pre-processed version of the first microphone array audio signals) and the analysis determined parameters (which may be in the form of metadata combined with the audio signals) in the form of estimated direction 404, energy ratio 406 and distance 408 parameters. Furthermore the synthesis processor 409 may be further configured to receive the head orientation and translation signals 416.

The synthesis processor 409 is configured to perform the synthesis (or decoding) part of the processing block. In other words the synthesis processor 409 is configured to process the received first microphone array audio signals 402 based on the associated parameters, such as the directions 404, the energy ratio 406 and the distance 408 and furthermore based on the received head orientation and translation signal parameters 416 to generate a suitably rendered audio signal which may be output to an output device. For example as shown in FIG. 4 the synthesis processor 409 may be configured to generate a suitable binaural output audio signal 418 and pass this output to headphones 417. However in some embodiments the rendering may be made in any suitable multichannel output format. Furthermore in some embodiments the output may be a single channel audio signal with suitable side channel information for regenerating a multichannel audio signal format. For example a single channel and additional side information data may be generated which would be suitable for transmission over low data bandwidth channels.

In other words the synthesis block (which is shown in FIG. 4 as the synthesis processor 409) can be configured to utilize the directional and distance metadata to enable 6DOF audio rendering at the decoder side using any suitable device.

Figure 5:
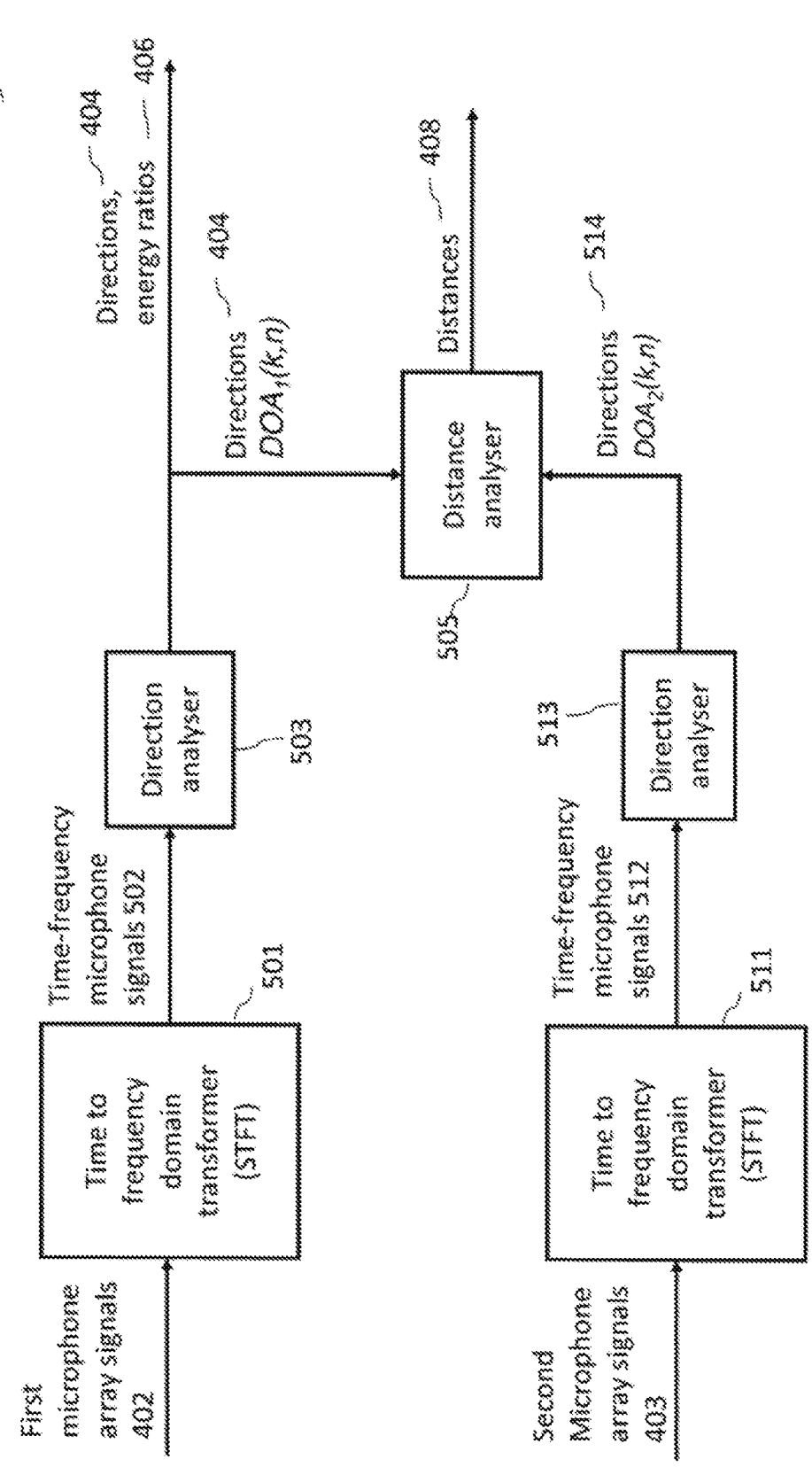
FIG. 5 shows schematically the analysis processor as shown in FIG. 4 according to some embodiments.

With respect to FIG. 5 an example analysis processor 401 (as shown in FIG. 4) according to some embodiments is described in further detail. The analysis processor 401 in some embodiments comprises a time-frequency domain transformer 501.

In some embodiments time to frequency domain transformer 501 is configured to receive the first microphone array audio signals 402 and apply a suitable time to frequency domain transform such as a Short Time Fourier Transform (STFT) in order to convert the input time domain signals into a suitable frequency domain representation.

The frequency domain representation is divided into K subbands. Let us denote a time-domain microphone-array audio signals 402 as $x_m(t)$, where m is the microphone index and t is the time domain sample index. Thus for example the microphone array audio signals 402 may be represented in the time-frequency domain representation by $$X_m(b,n),$$

Where b is the frequency bin index and n is the frame index. In another expression, n can be considered as a time index with a lower sampling rate than t. These frequency bins can be grouped into subbands that group one or more of the bins into a band index k=0, . . . , K−1. Each subband k has a lowest bin $b_{k,low}$ and a highest bin $b_{k,high}$, and the subband contains all bins from $b_{k,low}$ to $b_{k,high}$.

The widths of the subbands can approximate any suitable distribution. For example the Equivalent rectangular bandwidth (ERB) scale or the Bark scale. The time-frequency microphone audio signals 502 can in some embodiments be output to a direction analyser 503.

In some embodiments the analysis processor 401 comprises a direction analyser 503. The direction analyser 503 may be configured to receive the time-frequency (first microphone array) audio signals 502 and based on these signal estimate direction of arrival (DOA) information. The estimation of the direction-of-arrival (DOA) based on the audio signals can be performed using any audio based DOA determination.

For example in some embodiments the direction analyser 503 is configured to estimate the direction with two microphone channels. This represents the simplest configuration to estimate a direction of arrival, and can provide a direction estimate within an arc of 180 degrees in a single plane. More complex processing with more microphones can readily provide 360 degrees or 3D directional estimates. In the simple case of two microphones, the task is to find delay $\tau_b$ that maximizes the correlation between the two channels for subband b. This can be accomplished by creating time-shifted versions of the signal in channel 2, and correlating these with the signal on channel 1.

A time shift of τ time domain samples of $X_m(b, n)$, where m=2, can be obtained as $$X_{m,\tau}(b, n) = X_m(b, n)e^{-j\frac{2\pi b\tau}{N}},$$

Where N is the length of the STFT operation. Now the optimal delay $\tau_k$ for band k (and time index n) is obtained from $$\max_{\tau_k} \sum_{b=b_{k,low}}^{b_{k,high}} \text{Re}(X_{2,\tau_k}^*(b,n)X_1(b,n)), \tau_k \in [-D_{max}, D_{max}]$$

where Re indicates the real part of the result and * denotes the complex conjugate. The range of searching for the delay $D_{max}$ is selected based on the estimated maximum time delay of sound arrival to two microphones. Knowing the physical distribution of the channel microphones then permits the direction analyser 503 to determine a first direction of arrival based on the delay. Assuming the analysis of the microphone pair to be in the horizontal plane, the delay $\tau_k$ can be translated into an angular value as $$\theta(k,n) = \cos^{-1}\left(\frac{\tau_k}{D_{max}}\right).$$

The analysis using two microphones represented a simplified case of determining the direction-of-arrival from two microphones. It has been previously shown that it is possible to have more than two microphones and more than one delay determination, and to utilize trigonometry to determine the direction of arrival in 3D. Furthermore, there are various known methods to determine the direction of arrival from a microphone array using other means than delay estimation. For example, estimating the direction of the sound field intensity vector can also be utilized with some arrays to provide an estimate of the direction of arrival.

The direction analyser 503 may thus be configured to provide a DOA, $DOA_1(k,n)$, for each frequency band and temporal frame, denoted as ($\theta(k,n)$, $\varphi(k,n)$).

In some embodiments further to the DOA estimate the analyser 503 is configured to determine the ratio of the energy of the audio signal which can be considered to arrive from a direction. The direct-to-total energy ratio r(k,n) can be estimated, e.g., using a stability measure of the directional estimate, or using any correlation measures such as the correlation between the microphone audio signal, or any other suitable method to obtain a ratio parameter.

The estimated direction 404 and energy ratio 406 parameters may be output (to be used in the spatial synthesis). The parameters may, in some embodiments, be received in a parameter combiner (not shown) where the estimated direction and energy ratio parameters are combined with the distance parameters 408 as generated by the distance analyser 505 described hereafter.

In some embodiments the analysis processor 401 comprises a further time-frequency domain transformer 511.

In some embodiments the further time to frequency domain transformer 511 is configured to receive the second microphone array audio signals 403 and apply a suitable time to frequency domain transform such as a Short Time Fourier Transform (STFT) in order to convert the input time domain signals into a suitable time-frequency domain representation. The time-frequency microphone audio signals 512 can in some embodiments be output to a further direction analyser 513.

In some embodiments the analysis processor 401 comprises a further direction analyser 513. The direction analyser 513 may be configured to receive the time-frequency (second microphone array) audio signals 512 and based on these signal estimate further direction of arrival (DOA) parameters for the second microphone array. The estimation of the further direction-of-arrival (DOA) 514 based on the second microphone array audio signals can be performed using any audio based DOA determination. The further direction parameters $DOA_2(k,n)$ 514 may be passed to the distance analyser 505.

In some embodiments there is a single time to frequency domain transformer and a single direction analyser configured to process each of the first microphone array audio signals and the second microphone array audio signals.

In some embodiments the analysis processor 401 comprises a distance analyser 505. The distance analyser 505 is configured to receive the direction parameters (on a frequency band-by-band basis) from the direction analysers 503, 513.

The distance analyser 505 may be configured to estimate distances associated with the estimated direction of arrival parameters in relation to the capture devices in frequency bands. These distances may be output by the analysis processor 401. As described previously in some embodiments the analysis processor 401 is configured to combine the parameters and furthermore to associate (or further combine) the parameters to the first microphone array audio signals.

In some embodiments the distance analyser 505 is configured to obtain the distance parameter from the (at least) two microphone arrays by selecting or obtaining (at least) two direction estimates $DOA_1(k,n)$ and $DOA_2(k,n)$ for each time index (e.g., frame index) n and for each frequency band index k.

Having determined the distances the distance analyser 505 is configured to determine vectors $v_1$ and $v_2$ pointing towards the directions determined by $DOA_1(k,n)$ and $DOA_2(k,n)$.

In some embodiments the distance analyser 505 is then configured to denote $p_1$ and $p_2$ as centre position column vectors of the two microphone arrays.

Having determined the centre position and direction vectors the distance analyser 505 is configured to determine lines $y_1=p_1+d_1v_1$ and $y_2=p_2+d_2v_2$, where $d_1$ and $d_2$ are distance variables.

The distance analyser 505 is then configured to determine or solve $d_1$ and $d_2$ that minimizes $|y_1-y_2|$.

The parameter $d_1$ is then selected as the estimated distance parameter d(k,n).

In some embodiments the distance analyser 505 is configured to determine the $d_1=d(k,n)$ and $d_2$ that minimizes $|y_1-y_2|$, where the solution is in a matrix notation $$\begin{bmatrix} d_1 \\ d_2 \end{bmatrix} = \begin{bmatrix} 1 & -v_1^T v_2 \\ v_1^T v_2 & -1 \end{bmatrix}^{-1} \begin{bmatrix} v_1^T(p_2-p_1) \\ v_2^T(p_2-p_1) \end{bmatrix}$$

When $d_1$ and $d_2$ are known, then also the nearest distance of the two lines $|y_1-y_2|$ is also known.

As illustrated in FIGS. 3a and 3b, the distance estimates using the above formulation may either determine an actual distance of the position where the sound arrives from, or it may provide random data in a noisy (e.g., reverberant) condition.

Thus for example the directional estimates may point towards directions that form lines that diverge (such as shown in FIG. 3b) and thus do not intersect or closely pass each other. In this situation the minimum distance of the lines is determined to be when $d_1$ and/or $d_2$ is negative. Thus it is possible to detect an unreliable determined distance situation as the determined minimum distance is negative. In some embodiments the distance analyser 505 may be configured, when detecting a negative minimum value to set the distance parameter to a large value or infinite value, or apply another rule in order to override the distance parameter from being included within the parameters output (as metadata).

In some embodiments the distance analyser is configured to receive the direct-to-total energy ratios determined by the direction analyser where these parameters indicate that the audio signal and the perceived sound is mostly ambience. In such cases the directional estimates can be very noisy, and as such even though they may coincidentally intersect at a position that position may be considered to be more or less a random position and not a reliable indicator of the distance. In such situations the distance analyser 505 may reject any determined distances (even where the determined distance appears to be a convergent direction one) as these noise generated distances are in a perceptual sense unreliable with respect to producing good quality spatial processing. For example the listener or user of the spatial processor could coincidentally move the 6DOF rendering close to a position where the distance was falsely determined, which may result in audible artefacts. In some embodiments the distance analyser 505 is configured to detect such ambient or noise dominated situations by determining a minimum threshold for the direct-to-total (or other similar) energy ratio or other energy parameter(s). If the ratio (or similar value) is below the threshold, the distance information is set to a large value, infinite value, or other rules are applied to override the distance metadata from being included into the output or an indicator set to show that the distance parameter is unreliable.

In some embodiments the distance analyser 505 is configured to use the measure $|y_1-y_2|$ to determine whether the directional estimate is reliable and thus the distance is also unreliable. For unambiguous time-frequency intervals, the two directional estimates point towards the same estimate location or region in the sound space, and the value of $|y_1-y_2|$ is small. Thus in some embodiments the distance analyser 505 is configured to set or determine a threshold value and where $|y_1-y_2|$ is larger than the threshold the distance parameter is overridden or an indicator is set to show that the distance parameter is unreliable.

The distance parameter 408, and in some embodiments an indicator showing the reliability of the distance parameter is then output. In some embodiments the distance analyser 505 is configured to output the remaining distance parameters, i.e., those that are considered reliable, along with the other audio based parameters (such as directions and energy ratios) to enable the 6DOF spatial audio synthesis at the rendering side.

In some embodiments, the distance analyser 505 may be implemented at the spatial processor side, and thus an estimation of the reliability may be applied at the rendering side in an equivalent way based on the directional (and energy ratio) metadata, before applying the distance metadata in the 6DOF synthesis.

It should be noted that having unreliable distance estimates at some of the time-frequency intervals is not itself a problem. This is analogous to direction estimates. The direction estimates are accurate when a single sound source dominates a time-frequency tile, and inaccurate when there are multiple simultaneous prominent sound sources. This is not a problem in practice as human hearing also decodes the spatial perception especially on those time-frequency intervals where the spatial information is clearest, and disregards those time-frequency intervals that are "confusing". In other words, it is not perceptually necessary to detect reliable directions and distances at all time-frequency intervals, only at those where they matter most. Furthermore, the reliability of the distance estimate allows the spatial processor to determine when to use the distance estimate and therefore the output rendered audio should not contain audio artefacts caused by unreliable distance estimates.

In some embodiments therefore the apparatus may be configured to process the direction parameter based on the first microphone array signals and the at least one second direction parameter based on the second microphone (array) signals to determine at least one distance parameter by determining vectors pointing towards directions determined by the first direction parameter and the at least one second direction parameter. After this the apparatus in some embodiments may determine a first line which extends from the first microphone array position along the first direction parameter vector and at least one further line from the at least one second microphone position along the second direction parameter vector. Having done this the apparatus may determine a position along the first line and a position along the second line which has a minimum absolute distance, and the at least one distance is based on the position along the first line relative to the first microphone array position.

However in some embodiments the apparatus may determine the at least one distance is the position along the first line relative to the first microphone array position when the minimum absolute distance is smaller than a determined threshold. In some further embodiments the apparatus may determine the at least one distance is a defined value when the minimum absolute distance is greater than a determined threshold. Also in some embodiments the apparatus may determine the at least one distance is the position along the first line relative to the first microphone array position when the position along the first direction parameter vector is positive and the position along the second direction parameter vector is positive.

Furthermore in some embodiments the apparatus may be further configured to determine whether the at least one distance parameter is a reliable distance estimate by being configured to determine the at least one distance parameter is a reliable distance estimate when the minimum absolute distance is smaller than a determined threshold. In some further embodiments the apparatus may be configured to determine the at least one distance parameter is a reliable distance estimate when the position along the first direction parameter vector is positive and the position along the second direction parameter vector is positive.

In some embodiments the apparatus may further be configured to determine the at least one distance parameter for the at least one frequency band is a default value when either the position along the first direction parameter vector is negative or the position along the second direction parameter vector is negative In some embodiments the apparatus may be configured to generate an indicator based on whether the at least one distance parameter is (determined to be) a reliable distance estimate. Furthermore in some embodiments the apparatus may further output the at least one distance parameter with the indicator.

As discussed earlier in some embodiments, the parameters (metadata) are transmitted along a set of audio signals, and the audio signals may themselves be encoded, e.g., using AAC. The parameters (metadata) may be embedded to the AAC stream or to a media container such as the mp4 container along with the video and the audio tracks. The parameters (metadata) as such may consist of directions, direct-to-total ratios, and the distance parameters, all of which are determined in frequency bands. In some embodiments the parameters (metadata) can be quantized and encoded in a suitable way before embedding them to the media stream.

Figure 6:
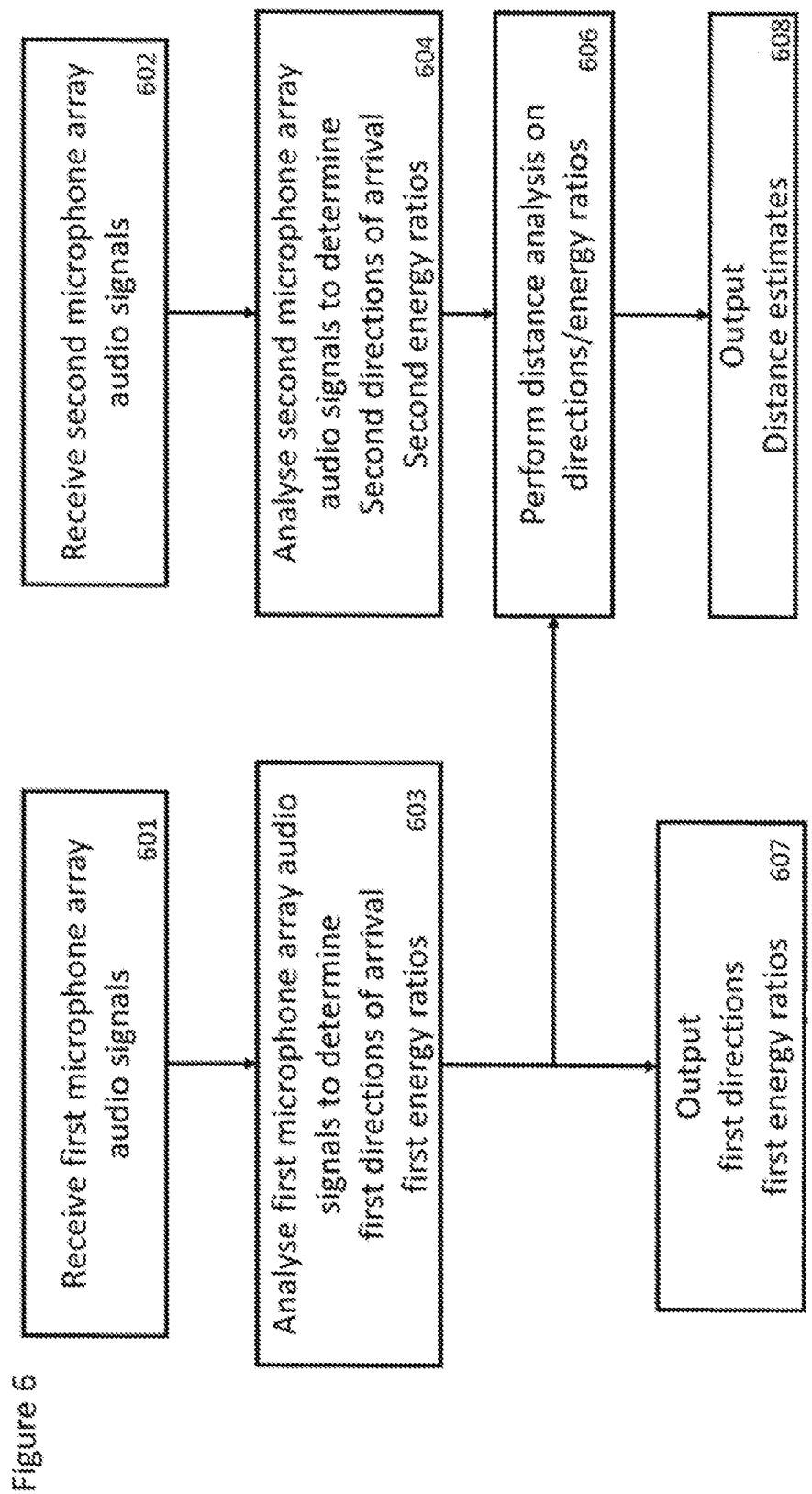
FIG. 6 shows a flow diagram of the operation of system as shown in FIGS. 4 and 5 with respect to the capture apparatus configured to generate the audio based parameters according to some embodiments.

With respect to FIG. 6 an example flow diagram showing the operation of the system shown in FIGS. 4 and 5 respectively is described.

The first operation is one of receiving the first microphone array audio signals.

The operation of receiving the first microphone array audio signals is shown in FIG. 6 by step 601.

The following operation is one of analysing the first microphone array audio signals on a frequency band-by-band basis to determine parameters. Specifically with respect to the distance determination the parameters determined are the direction-of-arrival (or direction) parameters. Furthermore optionally energy ratio parameters may be determined.

The operation of determining the primary (array) direction parameters (and optionally the primary array energy ratios) is shown in FIG. 6 by step 603.

The method may further run in parallel or overlapping with the above two operations the following two operations:

Receiving the second microphone array audio signals is shown in FIG. 6 by step 602; Analysing the second microphone array audio signals on a frequency band-by-band basis to determine parameters. Specifically with respect to the distance determination the parameters determined are the secondary (array) direction-of-arrival (DOA or direction) and optionally the secondary (array) energy ratio parameters shown in FIG. 6 by step 604.

Having determined the parameters associated with the first microphone array the method may output the primary directions (and optionally the primary energy ratios).

The operation of outputting the directions and energy (or direct to total) ratios associated with the first microphone array audio signals is shown in FIG. 6 by step 607.

Furthermore having determined the parameters associated with the first microphone array and the second microphone array the method may be configured to perform the distance analysis based on the directions/energy ratios from the microphone arrays. This operation is shown in FIG. 6 in step 606 and described in further detail in the flow diagram in FIG. 7.

Having determined the distance estimates the method may then output the determined distance parameters as shown in FIG. 6 by step 608.

Figure 7:
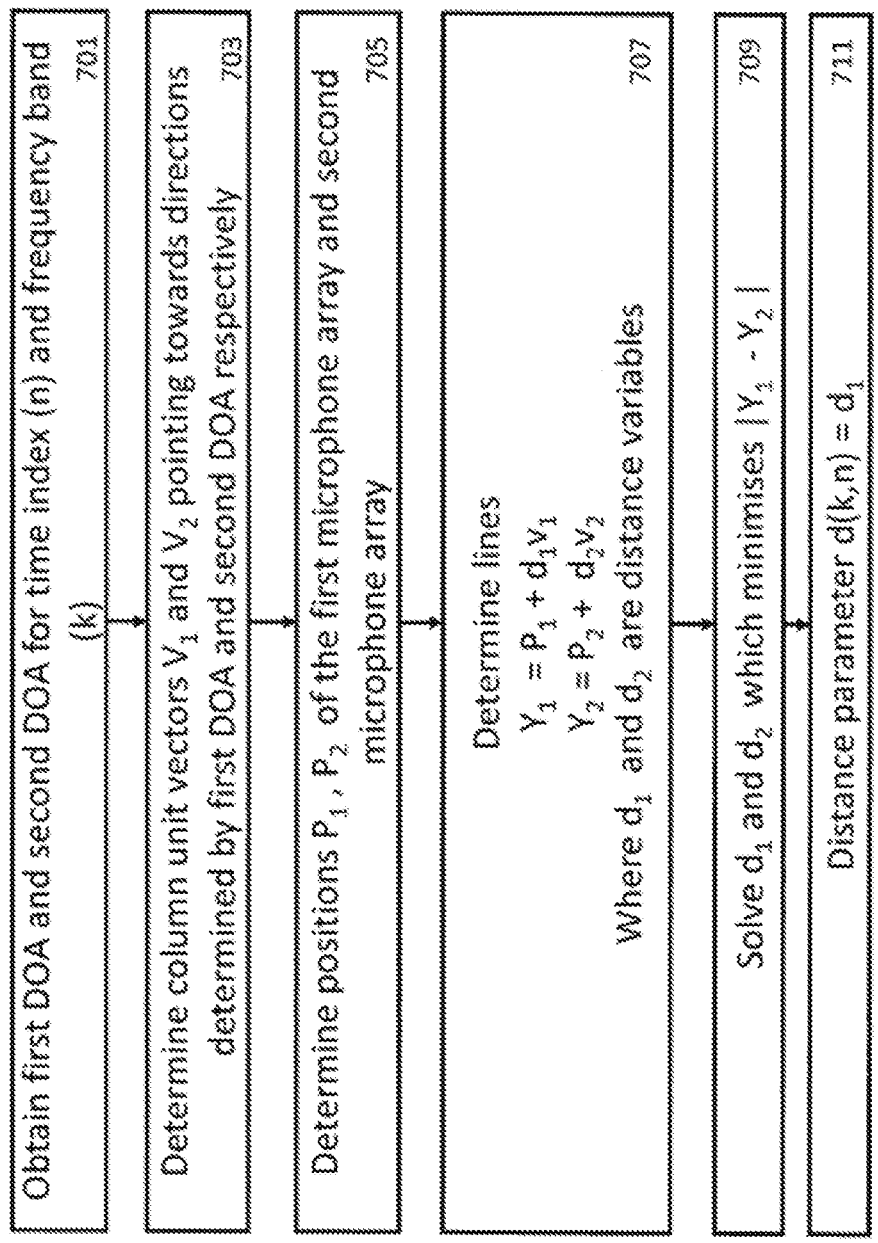
FIG. 7 shows a further flow diagram of the operation of distance analyser as shown in FIG. 5 according to some embodiments.

With respect to FIG. 7 the operation of performing the distance analysis as described above in FIG. 6 by step 606 is described.

The first operation is one of obtaining first microphone array DOA parameters and second microphone array DOA parameters for time index (n) and frequency band (k).

The operation of obtaining first microphone array DOA parameters and second microphone array DOA parameters for time index (n) and frequency band (k) is shown in FIG. 7 by step 701.

A next operation is one of determining vectors $V_1$ and $V_2$ pointing towards directions determined by the first microphone array DOA parameters and second microphone array DOA parameters respectively.

The operation of determining vectors $V_1$ and $V_2$ pointing towards directions determined by the first microphone array DOA parameters and second microphone array DOA parameters respectively is shown in FIG. 7 by step 703.

The following operation is one of determining positions $P_1$, $P_2$ of the first microphone array and second microphone array.

The operation of determining positions $P_1$, $P_2$ of the first microphone array and second microphone array is shown in FIG. 7 by step 705.

The next operation is determining the lines $Y_1=P_1+d_1v_1$, $Y_2=P_2+d_2v_2$, where $d_1$ and $d_2$ are the distance variables from the first microphone array and second microphone array respectively.

The operation of determining the lines is shown in FIG. 7 by step 707.

The following operation is to solve the lines for $d_1$ and $d_2$ where the solution minimises the distance between the lines $|Y_1-Y_2|$.

The operation of solving the lines for $d_1$ and $d_2$ where the solution minimises $|Y_1-Y_2|$ is shown in FIG. 7 by step 709.

Finally the distance parameter is set to $d(k,n)=d_1$. The operation of setting the distance parameter as $d(k,n)=d_1$ is shown in FIG. 7 by step 711.

The synthesis processor 409 (as shown in FIG. 4), may thus receive at least one audio signal originating from at least one microphone (the signal may also be pre-processed) and the associated parameters in frequency bands as input, and process these to generate a spatialized audio output (which may comprise at least two channels) in frequency bands using the parameters, the at least one audio signal, the tracked head rotation/orientation, and the tracked viewing position. It may be configured to generate this spatialized audio output where both the directional and distance metadata originate from the analysis of at least the signals of a microphone array in the captured sound field (such as that in a VR camera).

In other words, the audio scene may be reproduced by the synthesis processor such that it is configured to react to the user (listener's) movement and rotation, providing immersive 6DOF audio reproduction.

An example usage as described earlier is one where the audio signals had been captured with Nokia OZO, and are reproduced with a computer with a HMD and headphones, or a mobile phone attached to a Daydream View—type head mount. The HMD (or similar) is able to provide head rotation and position information. Software (in the computer or in the phone) may include processing algorithms utilizing the distance and direction metadata in frequency bands to adapt the audio signal spatialization. The media stream includes at least one channel of audio signal and the audio spatial metadata.

In some embodiments the media stream can be received from a video streaming service or any other source. The source of the media stream is configured therefore in some embodiments to provide the required directional and distance metadata. In some embodiments, and as described earlier the distance metadata is generated within the synthesis processor where the synthesis processor comprises a distance analyser similar to that described above. For example in some embodiments the synthesis processor comprises a distance analyser similar to the distance analyser 505 described above and configured to generate the distance estimates from the audio signals and/or direction parameters.

The proposed methods can be considered to be an extension of the spatial-audio processing method. As an input, the proposed method takes audio analysis derived parameters such as directions, direct-to-total energy ratios, and distances in frequency bands, and reproduction or playback derived parameters such as head orientation and translation parameters.

The processing method thus uses head position and orientation tracking, distance parameter(s) in frequency bands, and direction parameter(s) in frequency bands in order to adjust the direction(s) and the gains (or energies) of the direct component(s) in frequency bands to enable the 6DOF audio reproduction of captured audio.

In some embodiments adjusting the gains relates primarily to the movement towards or away from the determined direction of the arriving sound, and the adjustment of the direction(s) relate primarily to moving sideways with respect to the determined direction of the arriving sound.

As discussed previously the directional (and distance) parameters in general do not necessarily point towards a direction of (and distance to) a particular sound source like in virtual worlds. The sound in a frequency band can thus arrive from a wall reflection, or be a superimposition of several arriving sounds. The direction and distance estimates, which are estimated in frequency bands, thus reflect a prominent or averaged direction and a prominent or averaged distance at each temporal estimation interval.

An example synthesis processor 409, such as shown in FIG. 4 can, for example, be a computer or a mobile phone (running suitable software), or alternatively a specific device utilizing, for example, FPGAs or ASICs. The input to the synthesis processor 409 is in some embodiments the microphone array audio signals 402 (which may be pre-processed), the direction parameters 304, the energy ratio parameters 406, and distance parameters 408, and the head orientation and translation parameters 416.

In some embodiments the synthesis processor 409 comprises a time to frequency domain transformer. The time to frequency domain transformer is configured to receive the microphone array audio signals (or a preprocessed, selected channel or downmixed version of the microphone array audio signals) and transformed into a frequency domain format. In some embodiments this may be achieved using a short-time Fourier transform (STFT). However any suitable transform may be used. The time to frequency domain transformer may then be configured to output the frequency domain transformed audio signals to a spatial synthesizer.

In some embodiments the synthesis processor 409 comprises a translator and rotator configured to receive the direction 404 and the distance 408 parameters (obtained for example from the metadata associated with the audio signals) as well as the head orientation and translation parameters 416 (obtained, for example, from an HMD). The translator and rotator may in some embodiments be configured to translate the directions based on the head position and the distances parameters.

In some embodiments this position translation may be performed using trigonometric determinations, for example, by translating the distance and direction parameters into a x,y,z position (or other co-ordinate system) in a defined space, and formulating the angle of a vector from the head position to the determined position.

Having translated the position, the translated directions may be rotated based on the head orientation. In a similar manner to the earlier operation this can be derived using trigonometric processing.

In such a manner the directions may be translated and rotated to produce a processed direction of arrival, which corresponds to the head position and orientation. The processed direction parameters can be forwarded to the spatial synthesizer.

In some embodiments the synthesis processor 409 may comprise a distance gain determiner. The distance gain determiner may be configured to receive the direction and the distance parameters alongside the head orientation and translation parameters. The distance gain determiner may be configured to determine frequency-dependent gains which are used to adjust the loudness due to head translation.

In some embodiments the distance gain determiner is configured to firstly, determine a translated distance d'(k,n). The translated distance can be determined using trigonometry in a corresponding way as the processed direction parameters were obtained, for example, by translating the distance and direction parameters into a x,y,z position (or other co-ordinate system) in a defined space, and formulating the distance d'(k,n) from the head position to the determined position. After that, a gain factor g(k,n) may be estimated in frequency bands, for example by using the following expression:

$$g(k, n) = \frac{d(k, n)}{d'(k, n)}$$

The resulting gain parameters may be forwarded to the spatial synthesizer.

In some embodiments the synthesis processor 409 may comprise a spatial synthesizer. The spatial synthesizer may in some embodiments receive the energy ratios (without any modifications) and furthermore receive the time-frequency domain audio signals (from the time to frequency domain transformer), the processed direction from the translator and rotator and the gains from the distance gain determiner.

The spatial synthesizer in some embodiments may be configured to operate in a manner similar to a conventional spatial synthesizer (such as a conventional SPAC), with two exceptions.

The spatial synthesizer in some embodiments may be configured to use the translated and the rotated directions as an input instead of the non-position tracked direction or only the rotated direction parameter. The processed (translated and rotated) direction parameters may be used as the input to a conventional spatial audio processing method with respect to positioning the directional part or component of the audio signal. The implementation of the rotated and translated direction enables the perceived sound to stay in the same place if the head is moved, enhancing the experience realism. The perceived ambient part of the synthesized spatial audio is not modified due to head translation, as it is assumed to be spatially distributed (in the same way as reverberation) and hence the effect due to head translation would be minimal.

The spatial synthesizer is further configured to adjust the loudness of the rendered sound. In some embodiments the frequency-dependent gain g(k,n) is used to amplify/attenuate the directional part (known as the mid-signal in some spatial audio capture systems). In some other embodiments, in which the rendering method uses an energy or covariance matrix domain approach to determine the spatial rendering, the gain parameter is applied as an energy multiplier $g^2(k, n)$ to increase or decrease the energy of the directional part (sound component). By doing this, the sound source is perceived to change loudness naturally when moving the head closer or further away from the sound source. Moreover, the direct-to-ambient ratio is affected as a consequence of the gain processing, yielding natural distance perception at the translated listener position.

In some embodiments it may be possible to take frequency-dependent air absorption into account, by modifying the gain-factor equation by a suitable frequency-dependent absorption coefficient. The spatial synthesizer may be configured to produce binaural signal in the time-frequency domain as an output.

The example shown here is one example implementation and other implementations may be employed. For example in some further embodiments frequency band energies are adjusted based on the change of the distance and the direct-to-total-energy ratio, then the direct-to-total energy ratio is adjusted to match the new scenario where the sound is closer or further away than it originally was (without position tracking), and then the already gain-modified frequency band signals, and the modified ratio parameters are provided (along with any other parameters) to a spatial audio synthesis module to effectively provide the 6DOF performance.

In some embodiments the synthesis processor 409 may comprise a frequency to time domain transformer. The frequency to time domain transformer or inverse time to frequency transformer may be an inverse STFT (in the case of STFT being used in the time to frequency transformer). The frequency to time domain transformer may thus generate time-domain binaural signals which may be passed to headphones or other suitable rendering equipment where the listener/user can listen to the 6DOF spatial audio.

In implementing these embodiments the reproduction of captured sound can be made more immersive: the listener/user is able to move within the captured audio scene and perceive sound sources within the environment at their correct positions and distances. Thus, 6DOF captured audio reproduction becomes readily available when 6DOF video capture is enabled.

These embodiments may furthermore be integrated to existing parametric spatial-audio rendering methods that operate in the time-frequency domain. Hence, the 6DOF rendering can be performed efficiently, and with optimal audio quality.

Determining a distance has been shown in the examples above in a mathematical form. The mathematical approach provides a solution that can be implemented as a computer software determining the distance parameter. In other words, any descriptions about vector algebra or any other mathematical operations may refer only to the design process that results as program code. The program code itself may not need to contain all the described mathematical steps.

Figure 8:
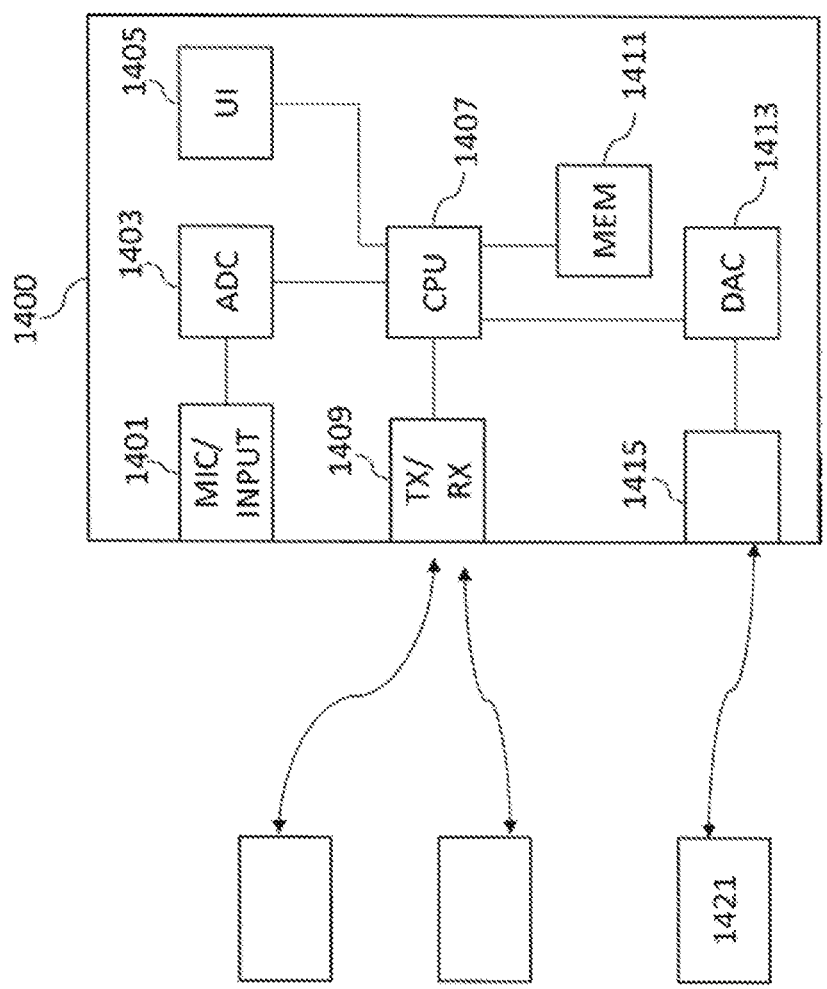
FIG. 8 shows schematically an example device suitable for implementing the apparatus shown in FIGS. 4 and 5.

With respect to FIG. 8 an example electronic device which may be used as the capture device and/or audio signal analyser/processor and/or playback device is shown. The device may be any suitable electronics device or apparatus. For example in some embodiments the device 1400 is a mobile device, user equipment, tablet computer, computer, audio playback apparatus, etc.

The device 1400 may comprise a microphone or microphone array 1401. The microphone or microphone array 1401 may comprise a plurality (for example a number N) of microphone elements. However it is understood that there may be any suitable configuration of microphones and any suitable number of microphones. In some embodiments the microphone or microphone array 1401 is separate from the apparatus and the audio signal transmitted to the apparatus by a wired or wireless coupling. The microphone or microphone array 1401 may in some embodiments be the microphone array as shown in the previous figures.

The microphone or microphone array may comprise transducers configured to convert acoustic waves into suitable electrical audio signals. In some embodiments the microphone or microphone array may comprise solid state microphones. In other words the microphones may be capable of capturing audio signals and outputting a suitable digital format signal. In some other embodiments the microphone or microphone array 1401 can comprise any suitable microphone type or audio capture means, for example condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphone or microphone array can in some embodiments output the audio captured signals to an analogue-to-digital converter (ADC) 1403.

The device 1400 may further comprise an analogue-to-digital converter 1403. The analogue-to-digital converter 1403 may be configured to receive the audio signals from each microphone 1401 and convert them into a format suitable for processing. In some embodiments where the microphone or microphone array comprises integrated microphones the analogue-to-digital converter is not required. The analogue-to-digital converter 1403 can be any suitable analogue-to-digital conversion or processing means. The analogue-to-digital converter 1403 may be configured to output the digital representations of the audio signal to a processor 1207 or to a memory 1411.

In some embodiments the device 1400 comprises at least one processor or central processing unit 1207. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some implements the device 1400 comprises a transceiver 1409. The transceiver 1409 in such embodiments can be coupled to the processor 1407 and configured to enable a communication with other apparatus or electronic devices, for example via a wireless communications network. The transceiver 1409 or any suitable transceiver or transmitter and/or receiver means can in some embodiments be configured to communicate with other electronic devices or apparatus via a wire or wired coupling.

For example the transceiver 1409 may be configured to communicate with the renderer as described herein.

The transceiver 1409 can communicate with further apparatus by any suitable known communications protocol. For example in some embodiments the transceiver 1409 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the device 1400 may be employed as at least part of the audio processor. As such the transceiver 1409 may be configured to receive the audio signals and positional information from the capture device microphones or microphone array and in some embodiments determine the parameters as described herein by using the processor 1407 executing suitable code. Furthermore the device may generate a suitable audio signal and parameter output to be transmitted to the renderer or spatial processing device.

In some embodiments the device 1400 may be employed as at least part of the renderer. As such the transceiver 1409 may be configured to receive the audio signals from the microphone or microphone array and in some embodiments the parameters determined at the capture device or processing device as described herein, and generate a suitable audio signal rendering by using the processor 1407 executing suitable code. The device 1400 may comprise a digital-to-analogue converter 1413. The digital-to-analogue converter 1413 may be coupled to the processor 1407 and/or memory 1411 and be configured to convert digital representations of audio signals (such as from the processor 1407 following an audio rendering of the audio signals as described herein) to a suitable analogue format suitable for presentation via an audio subsystem output. The digital-to-analogue converter (DAC) 1413 or signal processing means can in some embodiments be any suitable DAC technology.

Furthermore the device 1400 can comprise in some embodiments an audio subsystem output 1415. An example as shown in FIG. 8 shows the audio subsystem output 1415 as an output socket configured to enabling a coupling with headphones 1421. However the audio subsystem output 1415 may be any suitable audio output or a connection to an audio output. For example the audio subsystem output 1415 may be a connection to a multichannel speaker system.

In some embodiments the digital to analogue converter 1413 and audio subsystem 1415 may be implemented within a physically separate output device. For example the DAC 1413 and audio subsystem 1415 may be implemented as cordless earphones communicating with the device 1400 via the transceiver 1409.

Although the device 1400 is shown having both audio capture, audio processing and audio rendering components, it would be understood that in some embodiments the device 1400 can comprise just some of the elements.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method for spatial audio signal processing comprising:
   determining at least one first direction parameter for at least one frequency band based on microphone signals received from a first microphone array in relation to a sound source;

determining at least one second direction parameter for the at least one frequency band based on at least one microphone signal received from at least one second microphone in relation to the sound source, wherein microphones from the first microphone array and the at least one second microphone are spatially separated from each other;

processing the determined at least one first direction parameter and the at least one second direction parameter to determine at least one distance parameter for the at least one frequency band in relation to the first microphone array; and enabling an output and/or store of the at least one distance parameter, at least one audio signal, and the at least one first direction parameter.

2. The method as claimed in claim 1, wherein the at least one first direction parameter comprises at least one of:
a direction value;
an energy value associated with the direction value;
an energy ratio value associated with the direction value; or
a direct-to-total energy ratio value;
and wherein the at least one second direction parameter comprises at least one of:
a second direction value;
a second energy value associated with the second direction value;
a second energy ratio value associated with the second direction value; or
a second direct-to-total energy ratio value.

3. The method as claimed in claim 1, wherein the at least one second microphone comprises at least one of:
a microphone array comprising a plurality of microphones, wherein determining the at least one second direction parameter comprises processing one or more microphone signals from the plurality of microphones;
at least one directional microphone, wherein determining the at least one second direction parameter comprises processing at least one directional microphone signal from the at least one directional microphone; or
at least one movable directional microphone, wherein determining the at least one second direction parameter comprises processing at least one movable microphone signal from the at least one movable directional microphone as it is moved.

4. The method as claimed in claim 1, wherein the at least one audio signal comprises one of:
at least one audio signal based on the microphone signals received from the first microphone array;
at least one audio signal based on the at least one microphone signal received from the at least one second microphone;
at least one audio signal based on microphone signals received from at least one further microphone; or
at least one synthesized audio signal.

5. The method as claimed in claim 4, wherein the at least one first direction parameter is determined relative to a first defined position and the at least one second direction parameter is determined relative to a second defined position, wherein at least one of the first defined position the second defined position comprises one of:
a position defined with respect to the first microphone array;
a position defined with respect to the at least one second microphone; or
a position defined with respect to the at least one further microphone.

6. The method as claimed in claim 1, wherein determining the at least one distance parameter for the at least one frequency band comprises:
determining the at least one distance parameter is a first type of estimate; and
determining the at least one distance parameter value based on whether the at least one distance parameter is the first type of estimate.

7. The method as claimed in claim 1, wherein processing the determined at least one first direction parameter and the at least one second direction parameter to determine the at least one distance parameter for the at least one frequency band comprises:
determining vectors pointing towards directions determined with the at least one first direction parameter and the at least one second direction parameter;
determining a first line which extends from a first microphone array position along a first direction parameter vector and at least one second line from at least one second microphone position along a second direction parameter vector; and
determining a position along the first line and a position along the at least one second line which has a minimum absolute distance, wherein the at least one distance parameter is based on the position along the first line relative to the first microphone array position.

8. The method as claimed in claim 7, wherein processing the determined at least one first direction parameter and the at least one second direction parameter to determine the at least one distance parameter for the at least one frequency band comprises one of:
determining that the at least one distance parameter is the position along the first line relative to the first microphone array position;
determining that the at least one distance parameter is the position along the first line relative to the first microphone array position when the minimum absolute distance is smaller than a determined threshold; or
determining that the at least one distance parameter is the position along the first line relative to the first microphone array position when the position along the first direction parameter vector is positive and the position along the second direction parameter vector is positive.

9. The method as claimed in claim 8, wherein determining whether the at least one distance parameter is a first type of estimate comprises one of:
determining that the at least one distance parameter is the first type of estimate when the minimum absolute distance is smaller than the determined threshold; or
determining that the at least one distance parameter is the first type of estimate when the position along the first direction parameter vector is positive and the position along the second direction parameter vector is positive.

10. The method as claimed in claim 8, comprising determining the at least one distance parameter for the at least one frequency band is a predetermined value when:
either the position along the first direction parameter vector is negative or the position along the second direction parameter vector is negative; or
the minimum absolute distance is greater than the determined threshold.

11. The method as claimed in claim 8, further comprising at least one of:
generating an indicator based on whether the at least one distance parameter is a first type of estimate; or
outputting the at least one distance parameter with the generated indicator.

12. The method as claimed in claim 1, wherein determining the at least one first direction parameter for the at least one frequency band based on the microphone signals received from the first microphone array comprises:
- receiving the microphone signals from the first microphone array for a time window;
- time-frequency transforming the microphone signals from the first microphone array for the time window; and
- analysing the time-frequency transformed microphone signals from the first microphone array for the at least one frequency band to determine the at least one first direction parameter for the at least one frequency band.

13. The method as claimed in claim 12, further comprising at least one of:
- determining the at least one energy ratio parameter for the at least one frequency band based on the time-frequency transformed microphone signals from the first microphone array for the at least one frequency band;
- determining the at least one distance parameter based on the at least one energy ratio parameter for the at least one frequency band;
- determining the at least one distance parameter for the at least one frequency band is a predetermined value when the at least one energy ratio parameter for the at least one frequency band is below a determined threshold value; or
- determining the at least one distance parameter is a first type of estimate when the at least one energy ratio parameter for the least one frequency band is above a second determined threshold value.

14. The method as claimed in claim 13, further comprising at least one of:
- associating/combining: the at least one first direction parameter for the at least one frequency band; the at least one energy ratio parameter for the at least one frequency band; the at least one distance parameter for the at least one frequency band; and the at least one audio signal; or
- outputting respectively the association/combination of: the first direction parameter for the at least one frequency band; the energy ratio parameter for the at least one frequency band; the at least one distance parameter for the at least one frequency band; and the at least one audio signal.

15. The method as claimed in claim 1, wherein the at least one distance parameter, and the at least one first direction parameter are provided as metadata associated with the at least one audio signal.

16. A method for spatially processing at least one audio signal comprising:
- receiving the at least one audio signal;
- receiving at least one first direction parameter for at least one frequency band based on microphone signals received from a first microphone array in relation to a sound source;
- receiving at least one distance parameter determined from the at least one first direction parameter and at least one second direction parameter for the at least one frequency band based on at least one microphone signal from at least one second microphone in relation to the sound source, wherein the at least one distance parameter is for the at least one frequency band in relation to the first microphone array;
- receiving at one user input defining a six-degrees-of-freedom parameter; and
- processing the at least one audio signal to generate a rendered output audio signal based on: the at least one user input; the at least one first direction parameter; and the at least one distance parameter to enable a six-degree of freedom audio reproduction.

17. The method as claimed in claim 1, further comprising:
- receiving at least one user input defining a six-degrees-of-freedom parameter; and
- processing the at least one audio signal to generate a rendered output audio signal based on: the at least one user input; the at least one first direction parameter; and the at least one distance parameter to enable a six-degree of freedom audio reproduction.

18. The method as claimed in claim 1, wherein determining the at least one second direction parameter for the at least one frequency band based on the at least one microphone signal received from the at least one second microphone comprises:
- receiving the at least one microphone signal from the at least one second microphone for a time window;
- time-frequency transforming the at least one microphone signal from the at least one second microphone for the time window; and
- analysing the at least one time-frequency transformed microphone signal from the at least one second microphone to determine the at least one second direction parameter for the at least one frequency band.

19. An apparatus comprising:
processing circuitry; and
memory circuitry including computer program code, the memory circuitry and the computer program code configured to, with the processing circuitry, enable the apparatus to:
- determine at least one first direction parameter for at least one frequency band based on microphone signals received from a first microphone array in relation to a sound source;
- determine at least one second direction parameter for the at least one frequency band based on at least one microphone signal received from at least one second microphone in relation to the sound source, wherein microphones from the first microphone array and the at least one second microphone are spatially separated from each other;
- process the determined at least one first direction parameter and the at least one second direction parameter to determine at least one distance parameter for the at least one frequency band in relation to the first microphone array; and
- enable an output and/or store of the at least one distance parameter, at least one audio signal, and the at least one first direction parameter.

20. An apparatus comprising:
processing circuitry; and
memory circuitry including computer program code, the memory circuitry and the computer program code configured to, with the processing circuitry, enable the apparatus to:
- receive the at least one audio signal;
- receive at least one first direction parameter for at least one frequency band based on microphone signals received from a first microphone array in relation to a sound source;
- receive at least one distance parameter determined from the at least one first direction parameter and at least one second direction parameter for the at least one frequency band based on at least one microphone signal from at least one second microphone in relation to the sound source, wherein the at least one distance parameter is for the at least one frequency band in relation to the first microphone array;

receive at least one user input defining a six-degrees-of-freedom parameter; and process the at least one audio signal to generate a rendered output audio signal based on: the at least one user input; the at least one first direction parameter; and the at least one distance parameter to enable a six-degree of freedom audio reproduction.

* * * * *